Sept. 25, 1956   L. F. KOERNER   2,764,731
THERMISTOR NETWORK
Filed May 6, 1953

INVENTOR
L. F. KOERNER
BY
Ralph T. Holcomb
ATTORNEY

United States Patent Office 2,764,731
Patented Sept. 25, 1956

2,764,731

THERMISTOR NETWORK

Lawrence F. Koerner, Summit, N. J., assignor to Bell Telephone Laboratories, Incorporated, New York, N. Y., a corporation of New York Application May 6, 1953, Serial No. 353,305

5 Claims. (Cl. 323—69)

This invention relates to wave transmission networks and more particularly to means for compensating for impedance variation with temperature in such networks.

An object of the invention is to provide an impedance branch the resistance of which has a prescribed temperature characteristic.

Another object is to provide an impedance branch the resistance of which has a uniform negative or positive slope with increasing temperature.

A further object is to compensate for the variation of impedance with temperature in electrical networks.

Another object is to extend the temperature range over which impedance compensation may be provided in a network.

Still another object of the invention is to compensate the time constant of a resistance-capacitance network over a range of temperatures.

In electrical networks such, for example, as wave transmission networks, the impedance of a component branch often exhibits such a large variation over the range of operating temperatures that compensation is required. In accordance with the present invention, such compensation is provided over an extended temperature range by a two-terminal network comprising a plurality of thermistors, which may have either positive or negative temperature coefficients, and a plurality of resistors, either fixed or adjustable.

In the embodiment of the network shown, a first thermistor is connected in parallel with a branch comprising a first resistor in series with an impedance consisting of a second resistor and a second thermistor in parallel. The first thermistor is principally effective at one end of the temperature range and the second thermistor has its greatest effect at the other end of the range. The resistance of the network may be designed to have any of a large variety of preselected temperature characteristics. If, for example, the resistance of the network is to have a generally negative slope with increasing temperature, thermistors with negative temperature coefficients are used, the first thermistor has a resistance which is high compared to the sum of the resistance of the resistors at the lower end of the temperature range, and the second thermistor has a resistance which is low compared to the resistance of its shunting resistor at the upper end of the range. For a network with a generally positive slope, on the other hand, the thermistors have positive coefficients, the resistance of the first thermistor is high compared to the sum of the two resistances at the upper end of the range, and the resistance of the second thermistor is low compared to the shunting resistance at the lower end of the range. If desired, the slope, either negative or positive, may be made substantially constant over the operating temperature range.

As an example, there is disclosed the application of the invention to a network in order to compensate the time constant thereof over an extended range of temperatures. The network is of the ladder type comprising the series combination of a resistor of value R and a capacitor of value C, in which the time constant RC varies with temperature. A two-terminal impedance of the type described above is added in series with the resistor, and the resistance of the added impedance is designed to make the time constant of the entire combination substantially constant throughout a preselected temperature range.

The nature of the invention and its various objects, features, and advantages will appear more fully in the following detailed description of preferred embodiments illustrated in the accompanying drawing, of which Fig. 1 is a schematic circuit of a two-terminal thermistor network in accordance with the invention;

Fig. 2 presents typical curves showing the percentage change in resistance versus temperature for the network of Fig. 1 and for portions thereof;

Figure 1:
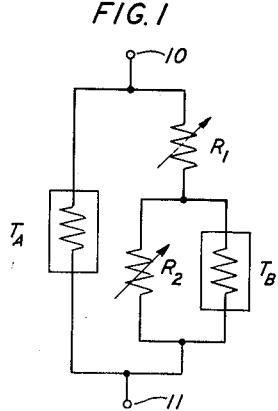

Taking up the figures in greater detail, the thermistor network in accordance with the invention shown in Fig. 1 comprises two thermistors $T_A$ and $T_B$ and two resistors $R_1$ and $R_2$, designated by their resistances, connected between a pair of terminals 10 and 11. The thermistor $T_A$ is paralleled by a branch comprising $R_1$ in series with an impedance consisting of $R_2$ and $T_B$ in parallel. The resistors may be made adjustable, as indicated by the arrows, to permit an adjustment of the network characteristic.

Figure 2:
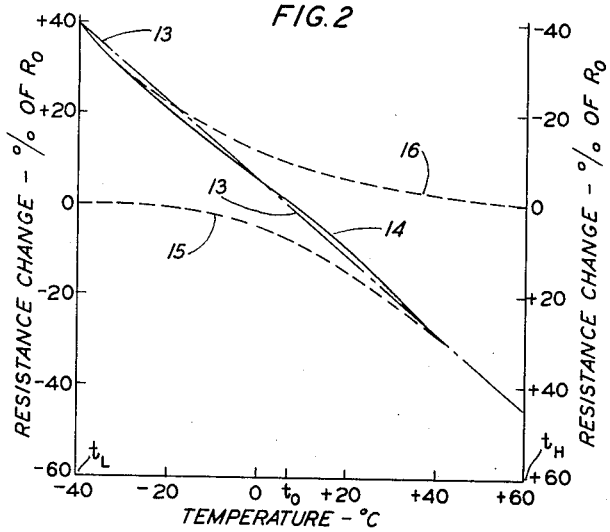

The network may be designed to have a variety of useful resistance versus temperature characteristics which depend upon the choice of the component elements. It is especially adapted to provide a resistance characteristic having a substantially constant slope, either positive or negative, over an extended range of temperatures. The dot-and-dash curve 13 of Fig. 2 shows, for example, a typical desired characteristic having a negative slope. Using the left ordinate scale, the percentage change in the resistance of the network from its nominal value $R^0$ at a selected reference temperature $t^0$ is plotted against the ambient temperature in degrees centigrade. The curve is a straight line extending from +37.9 per cent at −40 degrees to −44.6 per cent at +60 degrees for a total change of 82.5 per cent, with $t^0$ at +6 degrees.

There will now be presented an example of how to design the network of Fig. 1 to simulate the curve 13 of Fig. 2 when the left ordinate scale is read. It will be assumed that $R_0$ is 200 ohms. The desired resistance $R_L$ of the network at −40 degrees will, therefore, be 275.8 ohms and the desired resistance $R_H$ at +60 degrees will be 110.8 ohms, giving a difference of 165 ohms at the two temperatures. It will also be assumed that the changes in the resistances $R_1$ and $R_2$ over the temperature range of interest are small enough to be neglected.

Figure 3:
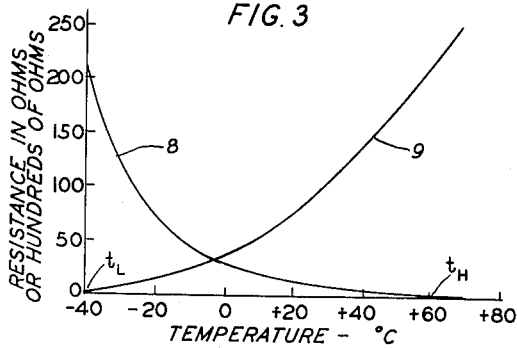
Fig. 3 shows typical resistance versus temperature characteristics of thermistors suitable for use in the network of Fig. 1.

First, thermistors $T_A$ and $T_B$ having negative temperature coefficients are selected. In order to obtain the desired characteristics, the resistance $R_{AL}$ of the thermistor $T_A$ at a temperature $t_L$ near the low end of the range should be high compared to the sum of $R_1$ and $R_2$, and the resistance $R_{BH}$ of the thermistor $T_B$ at a temperature $t_H$ near the high end of the range should be low compared to $R_2$. With these relationships, the elements $T_A$ and $R_1$ chiefly determine the characteristic of the network over the high portion of the temperature range, whereas $T_B$, $R_1$, and $R_2$ have their greatest effect over the low portion. The curve 8 of Fig. 3 shows resistance versus temperature characteristics of thermistors suitable for use as the elements $T_A$ and $T_B$. The ordinate scale represents ohms for $T_B$ and hundreds of ohms for $T_A$. Only one curve is shown because, for this particular example, it was found satisfactory for the resistance of $T_A$ to be a hundred times that of $T_B$ throughout the temperature range of interest. It is to be understood, of course, that other ratios of thermistor resistance may be required if other conditions are to be satisfied.

The resistances of the elements $T_A$ and $T_B$ at any temperature are thus known. This leaves only the elements $R_1$ and $R_2$ to be determined. Their values may be so chosen that the characteristic of the network matches the desired curve 13 at any two selected temperatures such, for example, as $t_L$ and $t_H$. The resistances $R_1$ and $R_2$ may be adjusted alternately until the required values are found by trial. Alternatively, their values may be found by setting up two independent equations and solving them simultaneously. For a match at the temperatures $t_L$ and $t_H$, these expressions are $$R_L = \frac{R_{AL}\left[R_1 + \frac{R_2 R_{BL}}{R_2 + R_{BL}}\right]}{R_{AL} + R_1 + \frac{R_2 R_{BL}}{R_2 + R_{BL}}} \quad (1)$$

and $$R_H = \frac{R_{AH}\left[R_1 + \frac{R_2 R_{BH}}{R_2 + R_{BH}}\right]}{R_{AH} + R_1 + \frac{R_2 R_{BH}}{R_2 + R_{BH}}} \quad (2)$$

where $R_L$ is the resistance of the network, $R_{AL}$ is the resistance of $T_A$, and $R_{BL}$ is the resistance of $T_B$, all at the first selected temperature $t_L$, and $R_H$ is the resistance of the network, $R_{AH}$ is the resistance of $T_A$, and $R_{BH}$ is the resistance of $T_B$, all at the second selected temperature $t_H$. If, for example, $t_L$ is chosen at −40 degrees and $t_H$ as +60 degrees, the corresponding values of $R_L$ and $R_H$ have already been given as 275.8 ohms and 110.8 ohms, respectively. From the curve 8 of Fig. 3 the values of $R_{AL}$, $R_{BL}$, $R_{AH}$, and $R_{BH}$ in ohms are found to be, respectively, 21,500, 215, 300, and 3. By substituting these values in Equations 1 and 2 and solving, the required values of $R_1$ and $R_2$ are found to be 173 ohms and 185 ohms, respectively.

The solid-line curve 14 of Fig. 2, reading the left ordinate scale, shows the characteristic obtainable with a network designed as explained above. It is seen that the curves 13 and 14 coincide at −40 degrees and at +60 degrees and that the one follows the other quite closely over the entire temperature range. The match might, in some cases, be improved by choosing the matching-point temperatures $t_L$ and $t_H$ farther within the range instead of at the ends thereof. For example, $t_L$ might be taken as −20 degrees and $t_H$ as +40 degrees. This would improve the match over the central portion of the range at the expense of a slight impairment at the ends.

The broken-line curves 15 and 16 of Fig. 2, using the left ordinate scale, are included to show the type of match obtainable if only a single thermistor is employed. If the network consisted only of $T_A$ and $R_1$, the characteristic 15 would result. This gives a good match in the upper portion of the range but a poor one at lower temperatures. The curve 16 shows the resulting characteristic if the network is constituted by only $R_1$, $R_2$, and $T_B$. In this case, the match is good in the lower part of the range but bad in the upper part. From a comparison of these characteristics with curve 14, it is apparent that the two-thermistor network of Fig. 1 greatly extends the temperature range over which a good match may be obtained.

Figure 4:
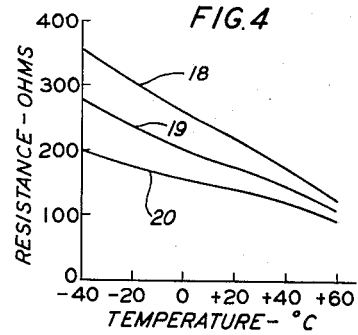
Fig. 4 shows how the resistance versus temperature characteristic of a network of the type shown in Fig. 1 having a negative slope varies with changes in the values of the resistances $R_1$ and $R_2$.

The resistance versus temperature characteristics of Fig. 4 show how, in the example just presented, the magnitude of the slope may be changed, while remaining substantially constant over the range, by changing the values of $R_1$ and $R_2$ while retaining the same thermistors $T_A$ and $T_B$. For the curve 18, the values of $R_1$ and $R_2$ in ohms are 250 and 155, respectively, for the curve 19 they are 176 and 187, and for the curve 20 they are 150 and 72.

As mentioned above, the network of Fig. 1 may, if desired, be designed to have a substantially constant positive slope over the temperature range from $t_L$ to $t_H$. In this case, the thermistors $T_A$ and $T_B$ will have positive temperature coefficients, the resistance of $T_A$ will be high compared to the sum of $R_1$ and $R_2$ at $T_H$, and the resistance of $T_B$ will be low compared to $R_2$ at $T_L$. For a second illustrative example it will be assumed that the desired resistance characteristic of the network has the constant positive slope shown by the curve 13 of Fig. 2 when the right ordinate scale is used. It will be noted that this scale is the same as the one shown on the left except that it is inverted. The desired value of $R_L$ at −40 degrees is 110.8 ohms, and that of $R_H$ at +60 degrees is 275.8 ohms. Thermistors having the temperature characteristics shown by the curve 9 of Fig. 3 are found to be suitable. For $T_A$, the ordinate scale represents ohms, and for $T_B$ it represents hundreds of ohms. From curve 9 the values of $R_{AL}$, $R_{BL}$, $R_{AH}$, and $R_{BH}$ in ohms are, respectively, 215, 21,500, 3, and 300. When these values are substituted in Equations 1 and 2 and the equations are solved, the required values of the resistances $R_1$ and $R_2$ are found to be 226 ohms and 65 ohms, respectively. The match obtained with the network thus designed is of the same order as that between the curves 13 and 14 of Fig. 2.

Figure 5:
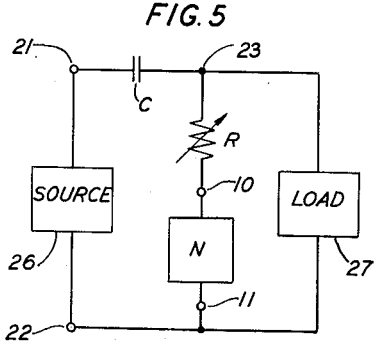
Fig. 5 is a schematic circuit of a ladder-type resistance-capacitance network to which a thermistor network has been added in accordance with the invention to compensate its time constant over a range of temperatures.

Fig. 5 shows schematically how the invention may be applied to a ladder-type, resistance-capacitance network to compensate the time constant over a range of temperatures. The network comprises a pair of input terminals 21 and 22 between which is connected the series combination of a capacitor designated by its capacitance C, a resistor designated by its resistance R, and a compensating network N which may be of the type shown in Fig. 1. The resistor R may conveniently be made adjustable, as indicated by the arrow. If R is adjusted, it may also be necessary to adjust the resistances $R_1$ and $R_2$ in N. A source of voltage 26 is shown connected to the input terminals. The load 27 may be connected between the terminal 22 and the common terminal 23 of C and R, as shown. In this case, C constitutes a series impedance branch of the network, and R and N form a shunt impedance branch thereof. Alternatively, the load 27 may be connected between the terminals 21 and 23, so that R and N are in the series branch and C in the shunt branch.

Figure 6:
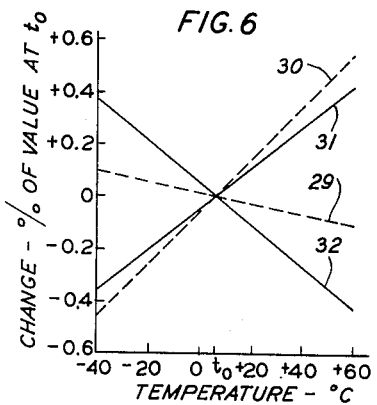
Fig. 6 presents typical curves showing the percentage change versus temperature for the resistance R and the capacitance C used in the network of Fig. 5.

It will be assumed that it is desired to keep the time constant, which is the product RC, constant over the temperature range from −40 degrees to +60 degrees centigrade. The valid assumption is also made that the value of C decreases linearly and the value of R increases linearly over this range, as shown by the broken-line curves 29 and 30, respectively, of Fig. 6. As compared with its value at the reference temperature $t_0$, which is +6 degrees, the capacitance C is 0.10 per cent higher at −40 degrees and 0.117 per cent lower at +60 degrees. On a like basis, the resistance R is 0.47 per cent lower at −40 degrees and 0.57 per cent higher at +60 degrees. The solid-line curve 31 gives the percentage change in the product RC. It is found by adding algebraically the ordinates of the curves 29 and 30 at each temperature, giving a straight line extending from −0.379 per cent at −40 degrees to +0.446 per cent at +60 degrees.

The function of the network N is to compensate the deviation curve 31. Its required characteristic is given by the curve 32, which passes through the point $t_0$ and has the same slope as the curve 31 except that it is negative instead of positive. The curve 32, therefore, is a straight line extending from +0.379 per cent at −40 degrees to −0.446 per cent at +60 degrees. Now, for example, if the resistance R has a value of 20,000 ohms at +6 degrees, its value at −40 degrees will be 75.8 ohms higher, and 89.2 ohms lower at +60 degrees, giving a difference of 165 ohms. The first example of the thermistor network of Fig. 1 worked out above, having the characteristic shown by the negative slope curve 14 of Fig. 2, is adapted to compensate for this variation in resistance, as it was designed to have a difference of 165 ohms at the temperature of −40 degrees and +60 degrees. The addition of the network N will increase the resistance of the branch comprising R and N by 200 ohms at +6 degrees, but this may readily be taken into account in choosing or adjusting the value of R. There is thus provided a network with a time constant which is constant within very close limits over the considerable temperature range from −40 degrees to +60 degrees.

The resistance-capacitance network with compensated time constant shown in Fig. 5 may, for example, be used in a plate-coupled, single-cycle multivibrator of the type shown in Fig. 9–1b on page 320 of the book by Von Tersch and Swago entitled "Recurrent Electrical Transients," published by Prentice-Hall, Inc., New York. In that figure, the elements corresponding to the capacitor C and the resistor R are designated, respectively, $C_c$ and $R_{g_2}$, the voltage source is the plate circuit of the tube $T_1$, and the load is the grid circuit of the tube $T_2$. The length of the operating cycle depends upon the effective time constant of the elements $C_c$ and $R_{g_2}$. In order to keep the period of the cycle constant over a range of temperatures, a compensating impedance of the type shown between the terminals 10 and 11 in Fig. 1 of the present application may be connected in series with the resistance $R_{g_2}$. In this way, the stability of the multivibrator with temperature changes is greatly improved.

It is to be understood that the above-described arrangements are illustrative of the application of the principles of the invention. Numerous other arrangements may be devised by those skilled in the art without departing from the spirit and scope of the invention.

What is claimed is:

1. A network comprising a first thermistor in parallel with a branch comprising a first resistor in series with an impedance consisting of a second resistor and a second thermistor in parallel, the resistance of said first thermistor being high compared to the sum of the resistances of said resistors at a first selected temperature and the resistance of said second thermistor being low compared to the resistance of said second resistor at a second selected temperature.

2. In combination, a network in accordance with claim 1, a resistor of resistance R, and a capacitor of capacitance C all connected in series, the product of R and C varying with temperature, and the component thermistors and resistors in said network being so selected and proportioned that the time constant of said combination is approximately constant throughout the range between said temperatures.

3. A network having a selected resistance $R_L$ at a first selected temperature and a different selected resistance $R_H$ at a second selected temperature, said network comprising a first thermistor in parallel with a branch comprising a first resistor of resistance $R_1$ in series with an impedance consisting of a second resistor of resistance $R_2$ and a second thermistor in parallel, said resistances having values which approximately satisfy the expressions $$R_L = \frac{R_{AL}\left[R_1 + \frac{R_2 R_{BL}}{R_2 + R_{BL}}\right]}{R_{AL} + R_1 + \frac{R_2 R_{BL}}{R_2 + R_{BL}}}$$

and $$R_H = \frac{R_{AH}\left[R_1 + \frac{R_2 R_{BH}}{R_2 + R_{BH}}\right]}{R_{AH} + R_1 + \frac{R_2 R_{BH}}{R_2 + R_{BH}}}$$

where $R_{AL}$ is the resistance of said first thermistor and $R_{BL}$ the resistance of said second thermistor at said first temperature, and $R_{AH}$ is the resistance of said first thermistor and $R_{BH}$ the resistance of said second thermistor at said second temperature.

4. In combination, a network in accordance with claim 3, a resistor of resistance R, and a capacitor of capacitance C all connected in series, the product of R and C varying with temperature, and said resistances $R_L$ and $R_H$ being so chosen that the time constant of said combination is approximately constant throughout the range between said temperatures.

5. A network comprising a first thermistor in parallel with a branch comprising a first resistor in series with an impedance consisting of a second resistor and a second thermistor in parallel, the resistance of said first thermistor being high compared to the sum of the resistances of said resistors at a first selected temperature, the resistance of said second thermistor being low compared to the resistance of said second resistor at a second selected temperature, and the resistances of said resistors being so chosen that said network has a preselected resistance at said first temperature and a different preselected resistance at said second temperature.

References Cited in the file of this patent

UNITED STATES PATENTS 2,332,643    Johnson               Oct. 26, 1943

FOREIGN PATENTS 600,684    Great Britain           Apr. 15, 1948